(12) United States Patent
Rozman et al.

(10) Patent No.: US 8,699,251 B2
(45) Date of Patent: Apr. 15, 2014

(54) DIRECT CURRENT GENERATING, MANAGEMENT AND DISTRIBUTION SYSTEM

(75) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 14 days.

(21) Appl. No.: 13/454,554

(22) Filed: Apr. 24, 2012

(65) Prior Publication Data

US 2013/0278193 A1 Oct. 24, 2013

(51) Int. Cl.
*H02M 7/48* (2007.01)

(52) U.S. Cl.
USPC .................. 363/71; 322/10; 322/25; 307/44

(58) Field of Classification Search
USPC ........... 363/71; 322/10, 25; 307/44; 361/601, 361/622, 627, 641
See application file for complete search history.

(56) References Cited

U.S. PATENT DOCUMENTS

| | | | |
|---|---|---|---|
| 4,423,477 A | 12/1983 | Gurr | |
| 5,581,168 A * | 12/1996 | Rozman et al. | 318/723 |
| 6,281,664 B1 * | 8/2001 | Nakamura et al. | 322/22 |
| 6,947,270 B2 * | 9/2005 | Gruening | 361/91.8 |
| 7,564,147 B2 | 7/2009 | Michalko | |
| 7,732,939 B2 | 6/2010 | Fuller et al. | |
| 2005/0276082 A1 * | 12/2005 | Panda et al. | 363/70 |
| 2006/0097519 A1 | 5/2006 | Steinke | |
| 2007/0257558 A1 | 11/2007 | Berenger | |
| 2008/0143182 A1 | 6/2008 | Raju | |
| 2008/0174177 A1 | 7/2008 | Langlois et al. | |
| 2009/0224599 A1 | 9/2009 | Yue et al. | |
| 2010/0066165 A1 | 3/2010 | Ganev et al. | |
| 2010/0181837 A1 | 7/2010 | Seeker et al. | |
| 2010/0258817 A1 * | 10/2010 | Nakayama et al. | 257/77 |
| 2011/0133703 A1 * | 6/2011 | Rozman et al. | 322/59 |
| 2012/0007425 A1 | 1/2012 | Rozman et al. | |

OTHER PUBLICATIONS

Gregory I. Rozman et al., pending U.S. Appl. No. 13/218,146 entitled "Power Management and Distribution Center for Constant Power Loads," filed with the U.S. Patent and Trademark Office on Aug. 25, 2011.

(Continued)

*Primary Examiner* — Eduardo Colon Santana
*Assistant Examiner* — Bickey Dhakal
(74) *Attorney, Agent, or Firm* — Cantor Colburn LLP (57) ABSTRACT

A direct current generating, management and distribution system includes a first armature winding, a first active rectifier having a first controller and coupled to the first armature winding, a first direct current bus coupled to the first active rectifier, a second armature winding, a second active rectifier having a second controller and coupled to the second armature winding, a second direct current bus coupled to the second active rectifier, a unit controller coupled to the first and second controllers, a first set of switches coupled to the first direct current bus and to the unit controller, a second set of switches coupled to the second direct current bus and to the unit controller, a third switch coupled to the first direct current bus and to the unit controller and a fourth switch coupled to the second direct current bus and the unit controller.

15 Claims, 5 Drawing Sheets

(56) References Cited

OTHER PUBLICATIONS

Gregory I. Rozman et al., pending U.S. Appl. No. 13/218,174 entitled "Solid State Power Controller for High Voltage Direct Current Systems," filed with the U.S. Patent and Trademark Office on Aug. 25, 2011.

Notification of Transmittal of the European Search Report; European application No. 13164809.9-1804, Aug. 29, 2013, 8 pages.

\* cited by examiner

DIRECT CURRENT GENERATING, MANAGEMENT AND DISTRIBUTION SYSTEM

BACKGROUND OF THE INVENTION

The present invention relates to direct current (DC) power systems, and more specifically, to a system that implements silicon carbide (SiC) metal on oxide field effect transistors (MOSFET) and silicon controlled rectifiers (SCR) for DC generation, power management, and DC power distribution.

Power generating systems such as those that can be implemented in military ground vehicles employ a permanent magnet generator (PMG) coupled with an active rectifier, followed by the power management and distribution (PMAD) unit. Conventional PMAD units utilize electromechanical contactors for high current circuits. These conventional electromechanical power switches have very low voltage drop and losses, but suffer from several limitations that are addressed with solid state power controllers (SSPCs). Electromechanical switches have a very slow response time requiring many tens of milliseconds to switch. This speed limitation results in excessive let-through energy into a fault, compromising the overall PMAD function. The speed limitation also presents significant challenges to advanced bidirectional bus architectures that require rapid PMAD fault response to ensure uninterrupted power to the loads.

Replacing electromechanical contactors with SSPCs for currents above 50 ADC present significant challenges. The electromechanical contactor is very efficient due to its low on-state resistance. Currently, a silicon carbide (SiC) power MOSFET is implemented in many solid state contactor applications, due to the ability to achieve a lower on-resistance and a higher current rating by paralleling several devices. A typical trip curve requires an increase of current capability of the solid state contactor up to 1000%. Increasing the number of parallel SiC MOSFETs helps to increase current capability of the solid state contactor but increases SSPC complexity, cost and size. As such, there is a need to improve current capability of the solid state contactor with a minimum impact on its cost and size.

BRIEF DESCRIPTION OF THE INVENTION

Exemplary embodiments include a direct current generating, management and distribution system, including a first armature winding, a first active rectifier having a first controller and coupled to the first armature winding, a first direct current bus coupled to the first active rectifier, a second armature winding, a second active rectifier having a second controller and coupled to the second armature winding, a second direct current bus coupled to the second active rectifier, a unit controller coupled to the first and second controllers, a first set of switches coupled to the first direct current bus and to the unit controller, a second set of switches coupled to the second direct current bus and to the unit controller, a third switch coupled to the first direct current bus and to the unit controller and a fourth switch coupled to the second direct current bus and the unit controller.

Additional exemplary embodiments include a direct current generating, management and distribution system, including a permanent magnet synchronous machine, a power management and distribution unit, a first active rectifier disposed between the permanent magnet synchronous machine and the power management and distribution unit via a first direct current bus, a second active rectifier disposed between the permanent magnet synchronous machine and the power management and distribution unit via a second direct current bus, a direct current load coupled to the power management and distribution unit and a dedicated motor load coupled to the power management and distribution unit, wherein the power management and distribution unit is configured to power cycle the first and second active rectifiers in response to overload conditions of the DC load and dedicated motor load.

Further exemplary embodiments include a direct current bus management method, including in response to an overload condition in a direct current generating, management and distribution system, powering off a first active rectifier, in response to a current in the direct current generating, management and distribution system falling below a predetermined current threshold, turning on the first active rectifier and turning off a second active rectifier and in response to the current in the generating, management and distribution system exceeding the predetermined current threshold, turning off the first active rectifier off and turning off the second active rectifier.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
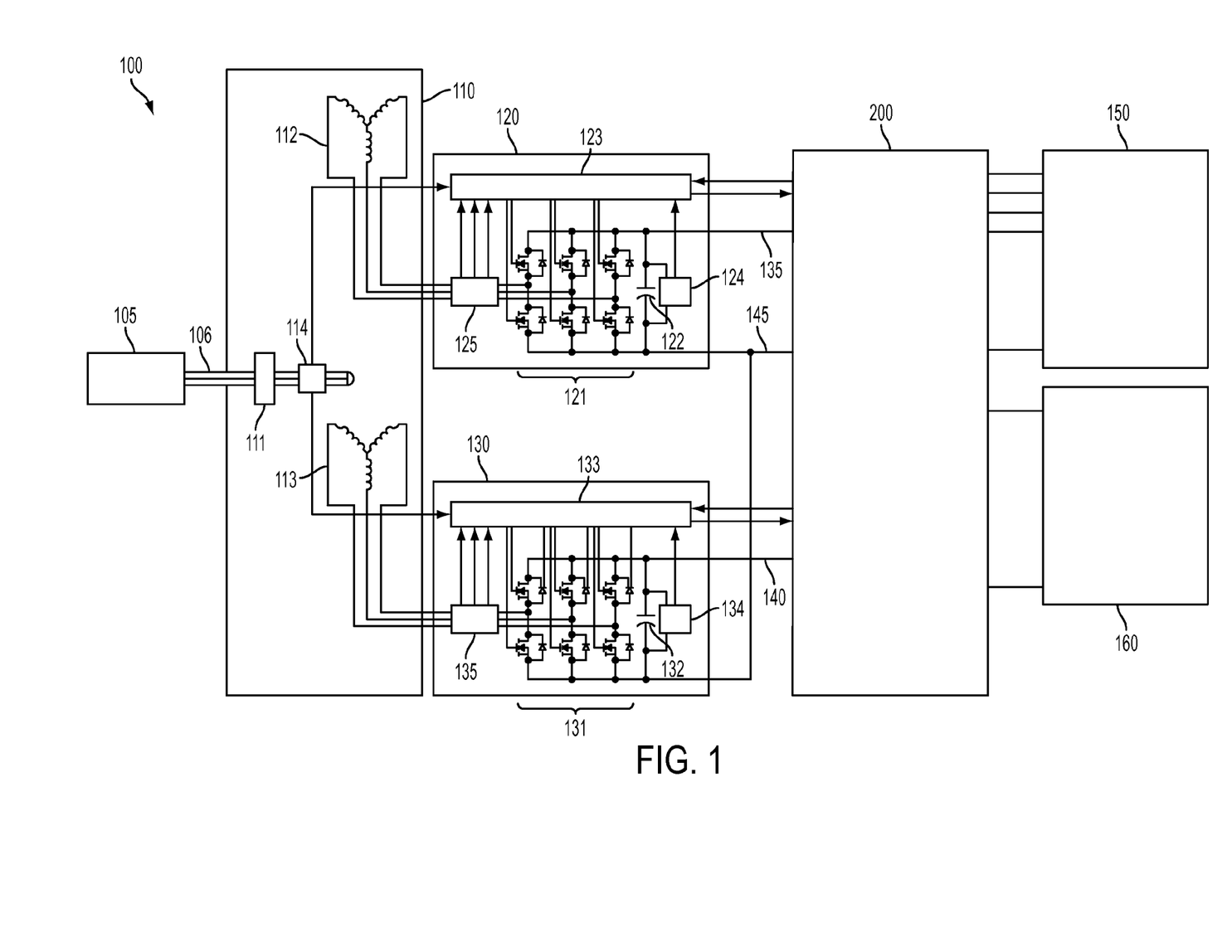
FIG. 1 illustrates a schematic diagram of an exemplary direct current power generation, management and distribution system.

FIG. 1 illustrates a schematic diagram of an exemplary DC power generation, management and distribution system 100. In one embodiment, the system 100 includes a prime mover 105, which can be any engine that converts an energy source (e.g., fuel) to work, and more specifically an internal combustion engine or a gas turbine engine. The system 100 further includes a permanent magnet synchronous machine (machine) 110 coupled to the prime mover 105 via a shaft 106. The shaft 106 is coupled to a permanent magnet 111 that is disposed in the machine 110. The machine 110 further includes first armature winding 112 and a second armature winding 113. It will be appreciated that the prime mover 105 may be selectively energized, which rotates the shaft 106, causing the permanent magnet 111 to induce a current (e.g., an alternating current (AC)) in the first and second armature windings 112, 113. The system 100 further includes first and second active rectifiers 120, 130 respectively coupled to the first and second armature windings 112, 113. The first and second active rectifiers 120, 130 each include one or more active switches (e.g., transistors) 121, 131 and capacitors 122, 132 for converting AC voltage to DC voltage and smoothing the DC voltage for distribution on a first DC bus and a second DC bus 135, 140 respectively. It will be appreciated that any rectifier or active rectifier can be implemented in other embodiments. The first and second active rectifiers 120, 130 each further include a first and second controller 123, 133 that monitor current via a current sensor 125 in each of the first and second active rectifiers 120, 130. The first and second controllers 123, 133 also monitor DC voltage via respective voltage sensors 124, 134 in each of the first and second active rectifiers 120, 130. The first and second controllers 123, 133 further monitor positions of the shaft 106 and permanent magnet via a position sensor 114 disposed in the machine 110. The first and second DC buses 135, 140 respectively couple the first and second rectifiers 120, 130 to an exemplary power management and distribution unit (unit) 200 (described further with respect to FIG. 2 herein). A common ground 145 also couples the first and second rectifiers 120, 130 and the unit 200. In one embodiment, the second active rectifier 130 includes SCRs instead of the diodes in parallel with upper power switches (mosfets) to allow turning the second rectifier off. In other embodiment, the second active rectifier 130 may be of 3-phase buck-boost topology. In one embodiment, the first DC bus 135 supports a majority of DC loads 150. In one embodiment, the second DC bus 140 supports a dedicated motor load 160 such as a cooling fan and provides DC power during overload conditions to the DC loads 150 associated with the first DC bus 135.

Figure 2:
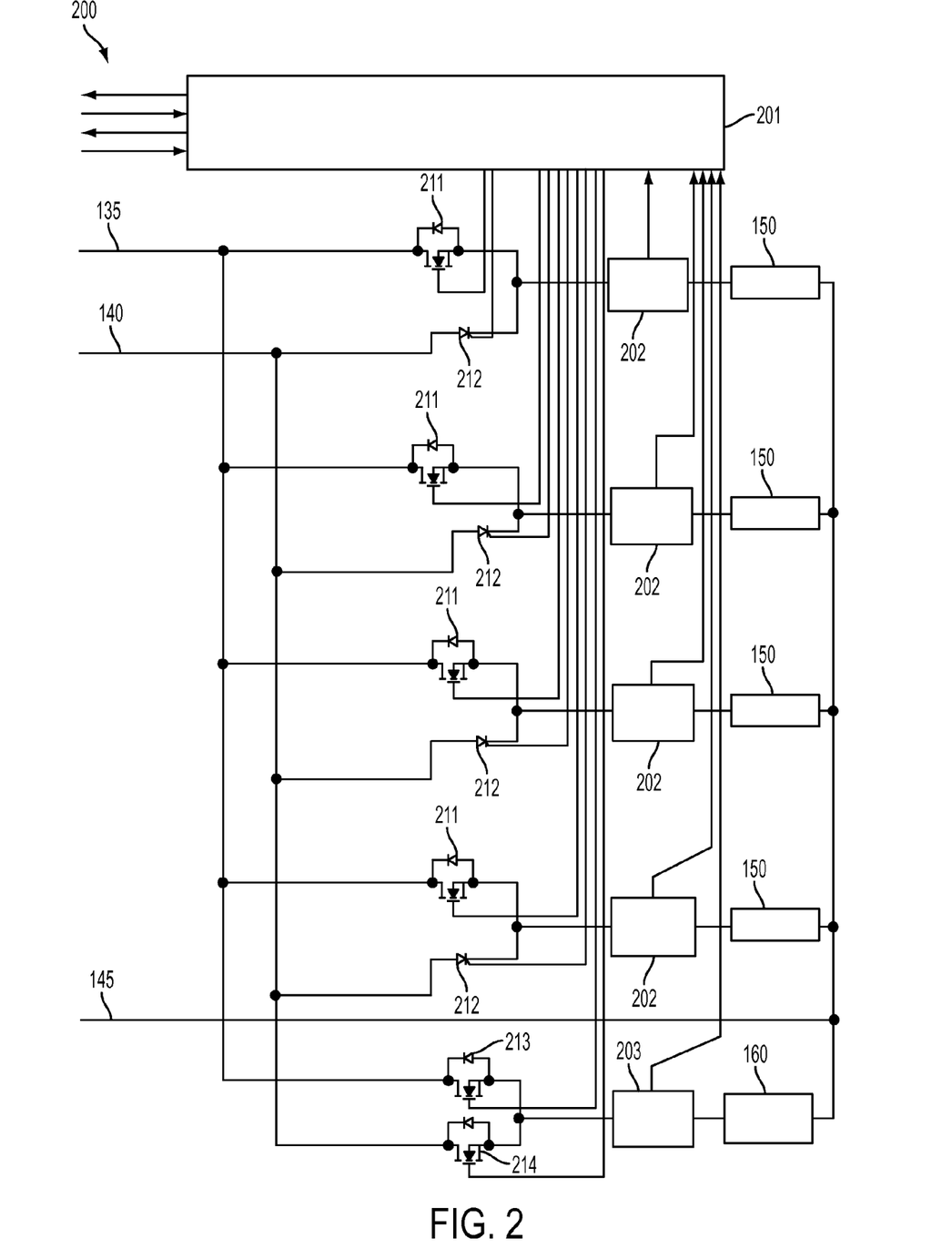
FIG. 2 illustrates an exemplary power management and distribution unit.

FIG. 2 illustrates the exemplary power management and distribution unit 200 of FIG. 1. In one embodiment, the unit 200 includes a first set of solid state contactors that include a first switch (e.g., a SiC MOSFET) 211 and a second switch (e.g., SCR) 212. The first set of contactors is coupled to each of the DC loads 150. The unit 200 further includes a second set of contactors that includes a third switch (e.g., a SiC MOSFET) 213 and a fourth switch (e.g., a SiC MOSFET) 214. The second set of contactors is coupled to the dedicated motor load 160. In one embodiment, the unit 200 further includes a unit controller 201 that monitors current to the loads 150 via a current sensor 202 and current to the dedicated motor load 160 via a current sensor 203. The unit controller 201 is also communicatively coupled to the first and second controllers 123, 133 (FIG. 1). As such, the unit controller 201 can monitor the loads 150, 160 and communicate the status to the first and second controllers 123, 133 (FIG. 1) and thus power cycle the active rectifiers 120, 130 as described further herein. In turn, the first and second controllers 123, 133 (FIG. 1) communicate the status of the active rectifiers 120, 130 to the unit controller 201 as further described herein. In one embodiment, the unit controller 201 is also coupled to the first switches 211, the second switches 212, the third switch 213 and the fourth switch 214, thereby controlling and monitoring the statuses (i.e., the "on" and "off" status) of the first switches 211, the second switches 212, the third switch 213 and the fourth switch 214. In one embodiment, the first, third and fourth switches (i.e., the SiC MOSFETs) 211, 213, 214 have approximately a 200% over current capability and the second switch 212 (i.e., the SCR) has approximately a 1000% over current capability. In one embodiment, the first DC bus 135 is electrically coupled to the first switches 211 and the third switch 213, and the second DC bus 140 is electrically coupled to the second switches 212 and to the fourth switch 214.

In one embodiment, during operation of the system 100, the first DC bus 135 powers the loads 150 via the first switches 211, and the second DC bus 140 powers the dedicated motor load 160 via the third switch 214. The system 200 monitors for overload conditions. During overload conditions, the power of the dedicated motor load 160 is reduced so that the second DC bus 140 can support the overload condition according to predetermined trip curves. The unit controller 201 has predetermined current thresholds, determined from predetermined trip curve, which are compared to current readings from the current sensors 202, 203 to determine overload conditions. The control of switches and active rectifiers during overload conditions is in accordance with flowcharts in FIG. 3 and FIG. 4. In addition, in one embodiment, when the unit controller 201 determines an overload condition, the unit controller 201 communicates the condition to the first and second controllers 123, 133. In the single channel overload condition described above, the controller 201 turns off the first switches 211 and the third switch 213 and 214. The first active rectifier 120 continues its operation to power rated loads, while the second active rectifier 130 provides power via switch 212 to the channel that requires more than 200% overload capability. The unit controller 201 continues to monitor the current via the current sensors 202, 203.

In one embodiment, the system 100 monitors for current levels exceeding or falling below predetermined levels. The control of switches and active rectifiers during overload conditions is in accordance with flowcharts in FIG. 3 and FIG. 4. In one embodiment, if the current falls below a predetermined threshold (as compared to predetermined trip curves), the unit controller 201 communicates the current change to the first and second controllers 123, 133. The controller 201 turns on the first switches 211 and the third switch 213. In addition, the second controller 133 reverses power flow of the second active rectifier 130 to discharge the dc bus 140, to reduce current through the SCR below holding current level. Once the current level of the second DC bus 140 is reduced below a predetermined value (e.g., the holding current of the SCR), the second switches 212 turn off, and switch 214 is turn on to power dedicated motor load 160 (e.g., a cooling fan). Once the second switches 212 are turned off, and the unit controller 201 detects the "off" state of the second switches 212, the unit controller 201 can communicate the status change to the first and second controllers 123, 133. In one embodiment, instead of SCRs, the second switches 212 can be gate-turn-off (GTO) devices. By implementing GTOs, the second active rectifier 130 may not require reducing voltage to the second DC bus 140 to turn off the second switches 212.

In one embodiment, if the first DC bus 135 is not available due to a malfunction, critical loads (e.g., any of the loads 150) may be powered by the second DC bus 140 by turning on the second switches 212 once voltage is applied to the second switches 212. Similarly, if the second DC bus 140 is not available due to a malfunction, the dedicated motor load 160 (e.g., a cooling fan) can be powered by the first DC bus via the first switches 211.

Figure 3:
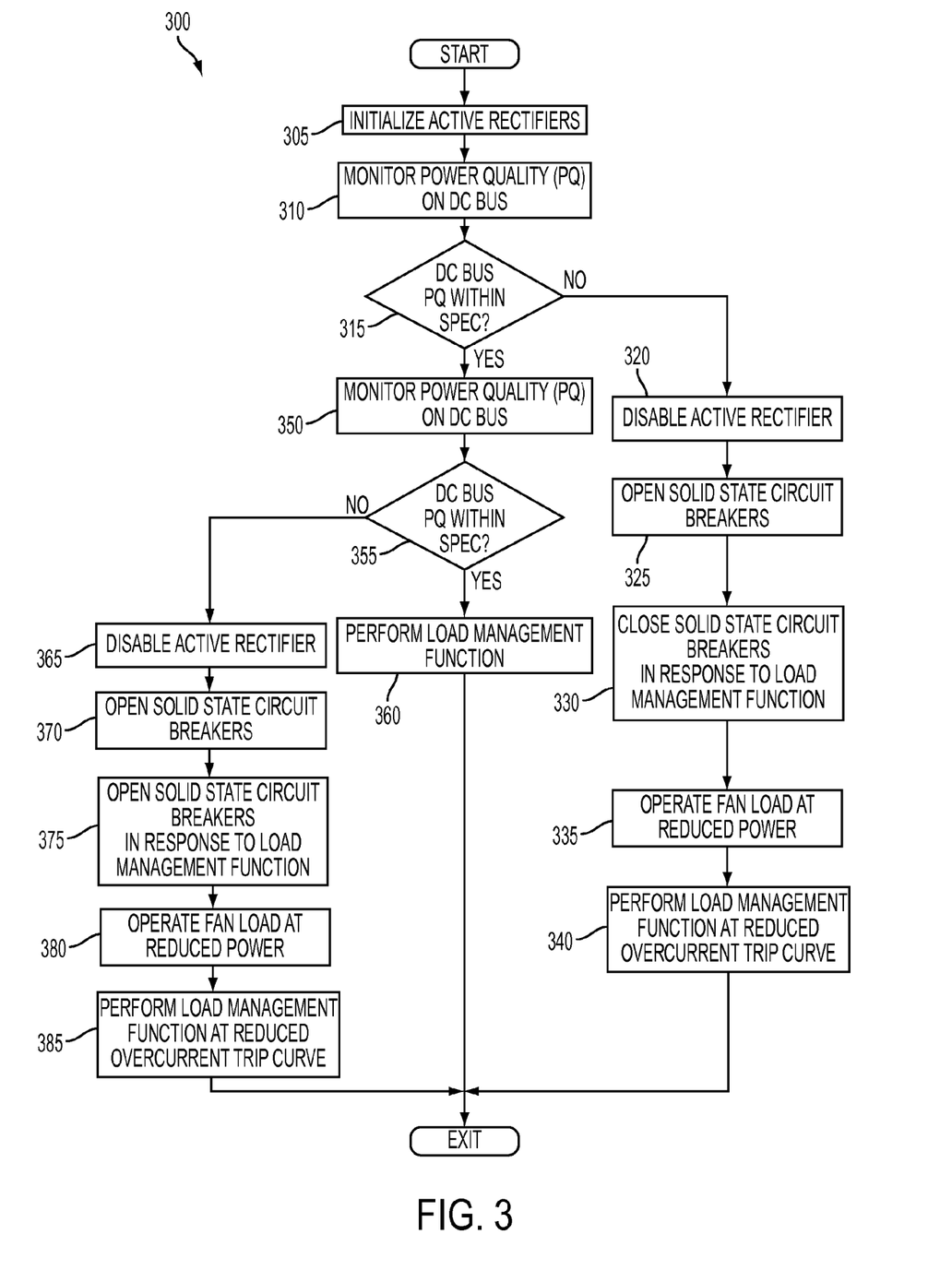
FIG. 3 illustrates a flow chart for a direct bus management method in accordance with exemplary embodiments.

FIG. 3 illustrates a flow chart for a direct bus management method in accordance with exemplary embodiments. At block 305, the system 100 initializes the active rectifiers 120, 130. At block 310, the unit 200 monitors the power quality on the first DC bus 135. At block 315, the unit 200 determines if the power quality on the first DC bus 135. If at block 315, the power quality on the first DC bus 135 is not within a predetermined specification, then at block 320 the unit 200 disables the first active rectifier 120. At block 325, the unit 200 opens the first switches 211 and the third switch 213. At block 330, the unit 200 closes the second switches 212 and the fourth switch 214 in response to a load management function issued by the controller 201. At block 335, the unit 200 operates the dedicated motor load 160 at a reduced power. At block 340, the unit 200 performs the load management function at a reduced overcurrent trip curve as described herein.

If at block 315, the power quality on the first DC bus 135 is within a predetermined specification, then at block 350, the unit 200 monitors the power quality on the second DC bus 140. At block 355, the unit 200 determines if the power quality on the second DC bus 140 is within specification. If at block 355, the power quality on the second DC bus 135 is not within a predetermined specification, then at block 365 the unit 200 disables the second active rectifier 130. At block 370, the unit 200 opens the second switches 212 and the fourth switch 214. At block 375, the unit 200 closes the first switches 211 and the third switch 213 in response to a load management function issued by the controller 201. At block 380, the unit 200 operates the dedicated motor load 160 at a reduced power. At block 385, the unit 200 performs the load management function at a reduced overcurrent trip curve as described herein. If at block 355, the power quality on the second DC bus 140 is within a predetermined specification, then at block 360, the unit 200 performs load management functions.

Figure 4:
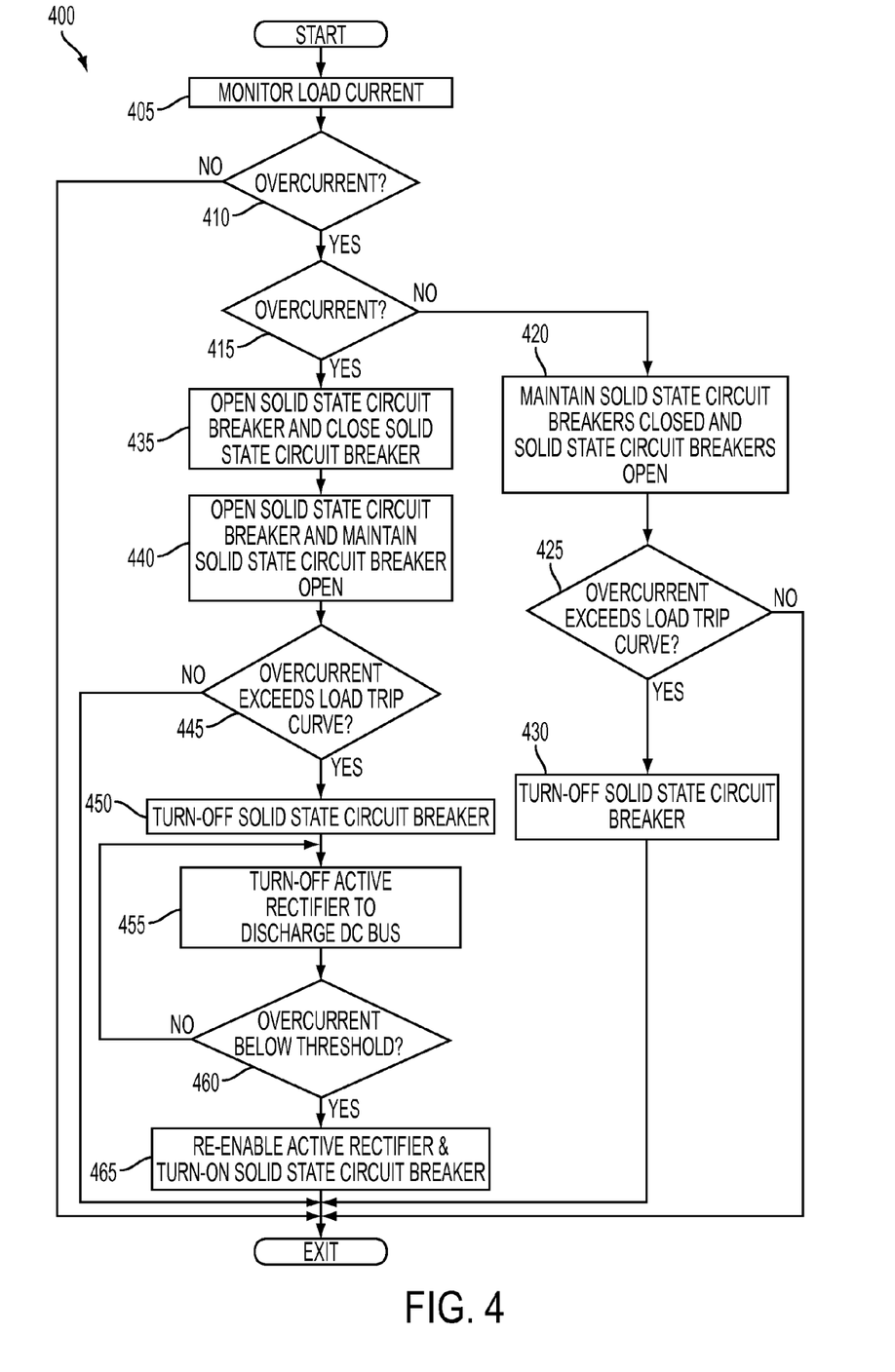
FIG. 4 illustrates a flow chart for a direct current bus generating system initialization method in accordance with exemplary embodiments.

FIG. 4 illustrates a flow chart for a direct current bus generating system single load management method 400 in accordance with exemplary embodiments. At block 405 the unit 200 monitors the load current in the system 100. At block 410, the unit 200 determines if there is an overcurrent condition. If there is no overcurrent condition at block 410, then the system 100 continues operation. If there is an overcurrent condition at block 410, then at block 415, the unit determines if the overcurrent condition exceeds a percentage (e.g., 200% of a predetermined current on a trip curve. If the overcurrent does not exceed the percentage at block 415, then at block 410, the unit 200 maintains the first switch 211 of the overloaded channel and the fourth switch 214 closed and the second switch 212 of the overloaded channel and the fourth switch 213 open. At block 425, the unit determines if the overcurrent exceeds the predetermined trip curve. If the overcurrent does not exceed the predetermined trip curve at block 425, then the system 100 continues operation. If the overcurrent does exceed the predetermined trip curve at block 425, then at block 430, the unit 200 turns off the first switches 211.

If at block 415, the overcurrent does exceed the percentage, then at block 435, the unit opens the first switch 211 and closes the second switch 212 of the overloaded channel. At block 440, the unit 200 opens the fourth switch 214 and maintains the third switch 213 open. At block 445, the unit determines if the overcurrent condition exceeds the predetermined trip curve. If at block 445, the overcurrent does not exceed the predetermined trip curve, then the system 100 continues to operate. If at block 445, the overcurrent does exceed the predetermined trip curve, then at block 450, the unit turns off the second switch 212 of the overloaded channel. At block 455, the unit turns-off the second active rectifier 130 to discharge the second DC bus 140. At block 460, the unit then determines if the overcurrent is below the predetermined threshold. If the overcurrent is not below the predetermined threshold at block 460, then the unit maintains turning-off condition of the second active rectifier 130 to discharge the second DC bus 140. If the overcurrent is below the predetermined threshold at block 460, then at block 465, the unit 200 re-enables the second active rectifier 130 and turns on the fourth switch 214.

Figure 5:
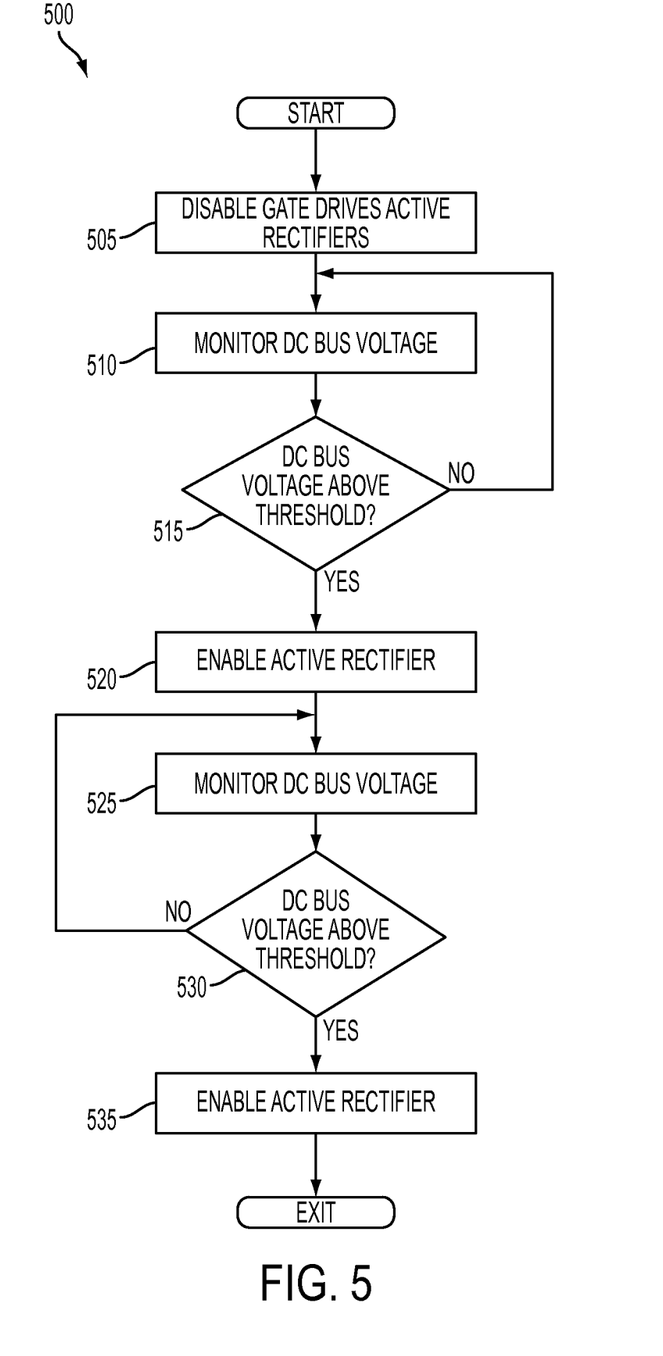
FIG. 5 illustrates a flowchart for a single load management method in accordance with exemplary embodiments.

FIG. 5 illustrates a flowchart for an initialization method in accordance with exemplary embodiments. At block 505, the unit disables (the gate drives are turned-off) the first and second active rectifiers 120, 130. At block 510, the unit 200 monitors the voltage on the first DC bus 135. At block 515, the unit determines if the voltage on the first DC bus 135 is above a predetermined threshold. If at block 515, the voltage on the first DC bus 135 is not above a predetermined threshold, then the unit continues to monitor the DV voltage on the first DC bus 135 at block 510. If at block 515, the voltage on the first DC bus 135 is above a predetermined threshold, then at block 520, the unit 200 enables the first active rectifier 120. At block 525, the unit monitors the voltage on the second DC bus 140. At block 530, the unit 200 determines if the voltage on the second DC bus 140 is above a predetermined threshold. If at block 530, the voltage on the second DC bus 140 is not above a predetermined threshold, then the unit 200 continues to monitor the voltage on the second DC bus 140 at block 525. If at block 530, the voltage on the second DC bus 140 is above a predetermined threshold, then at block 535, the unit enables the second active rectifier 130.

The first and second controllers 123, 133 and the unit controller 201 can be any suitable microcontroller or microprocessor for executing the instructions (e.g., on/off commands) described herein. As such, the suitable microcontroller or microprocessor can be any custom made or commercially available processor, a central processing unit (CPU), an auxiliary processor among several processors, a semiconductor based microprocessor (in the form of a microchip or chip set), a microprocessor, or generally any device for executing software instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the methods are implemented in hardware, the methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include the implementation of a dual generating channel architecture and a hybrid solid state contactor using SiC MOSFETs and Si SCRs, thereby improving system cost and size and providing fault tolerant operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A direct current (DC) generating, management and distribution system, comprising:
 a first armature winding;
 a first active rectifier having a first controller and coupled to the first armature winding;
 a first DC bus coupled to the first active rectifier;
 a second armature winding;
 a second active rectifier having a second controller and coupled to the second armature winding;
 a second DC bus coupled to the second active rectifier;
 a unit controller coupled to the first and second controllers;
 a first set of switches coupled to the first DC bus and to the unit controller;
 a second set of switches coupled to the second DC bus and to the unit controller;
 a third switch coupled to the first DC bus and to the unit controller; and
 a fourth switch coupled to the second DC bus and the unit controller;
 wherein the first controller is configured to power cycle the first active rectifier in response to overload conditions detected by the unit controller, thereby switching a state of the first set of switches and the third switch.

2. The system as claimed in claim 1 wherein the first and second set of switches are coupled to a DC load.

3. The system as claimed in claim 1 wherein the first set of switches, the third switch and the fourth switch are silicon carbide (SiC) metal on silicon field effect transistors (MOSFET).

4. The system as claimed in claim 2 wherein the third and fourth switches are coupled to a dedicated motor load.

5. The system as claimed in claim 4 wherein the unit controller is configured to communicate current conditions of the DC load and the dedicated motor load to the first and second controllers.

6. A direct current (DC) generating, management and distribution system, comprising:
 a first armature winding;
 a first active rectifier having a first controller and coupled to the first armature winding;
 a first DC bus coupled to the first active rectifier;
 a second armature winding;
 a second active rectifier having a second controller and coupled to the second armature winding;
 a second DC bus coupled to the second active rectifier;
 a unit controller coupled to the first and second controllers;
 a first set of switches coupled to the first DC bus and to the unit controller;
 a second set of switches coupled to the second DC bus and to the unit controller;
 a third switch coupled to the first DC bus and to the unit controller; and
 a fourth switch coupled to the second DC bus and the unit controller;
 wherein the second controller is configured to power cycle the second active rectifier in response to overload conditions detected by the unit controller, thereby switching a state of the fourth switch.

7. The system as claimed in claim 6 wherein the second set of switches are silicon controlled rectifiers (SCR), each SCR having a holding current.

8. The system as claimed in claim 7 wherein reversing a power flow of the second active rectifier reduces a current through each of the SCRs, and discharges the second DC bus.

9. The system as claimed in claim 8 wherein the SCRs power off in response to the current through the SCRs falling below the holding current.

10. A direct current (DC) generating, management and distribution system, comprising:
 a permanent magnet synchronous machine;
 a power management and distribution unit;
 a first active rectifier disposed between the permanent magnet synchronous machine and the power management and distribution unit via a first DC bus;
 a second active rectifier disposed between the permanent magnet synchronous machine and the power management and distribution unit via a second DC bus;
 a DC load coupled to the power management and distribution unit; and
 a dedicated motor load coupled to the power management and distribution unit,
 wherein the power management and distribution unit is configured to power cycle the first and second active rectifiers in response to overload conditions of the DC load and dedicated motor load;
 wherein the first active rectifier includes a first controller and the second active rectifier includes a second controller;
 wherein the power management and distribution unit comprises:
  a unit controller coupled to the first and second controllers;
  a first set of switches coupled to the first DC bus and to the unit controller;
  a second set of switches coupled to the second DC bus and to the unit controller;
  a third switch coupled to the first DC bus and to the unit controller; and
  a fourth switch coupled to the second DC bus and the unit controller;
 wherein the first controller is configured to power cycle the first active rectifier in response to overload conditions detected by the unit controller, thereby switching a state of the first set of switches and the third switch.

11. The system as claimed in claim 10 wherein the first and second set of switches are coupled to a DC load.

12. The system as claimed in claim 10 wherein the third and fourth switches are coupled to a dedicated motor load.

13. The system as claimed in claim 10 wherein the second controller is configured to power cycle the second active rectifier in response to overload conditions detected by the unit controller, thereby switching a state of the fourth switch.

14. The system as claimed in claim 10 wherein the second set of switches are silicon controlled rectifiers (SCR), and wherein the first set of switches, the third switch and the fourth switch are silicon carbide (SIC) metal on silicon field effect transistors (MOSFET).

15. The system as claimed in claim 12 wherein the unit controller is configured to communicate current conditions of the DC load and the dedicated motor load to the first and second controllers.

* * * * *